US006821606B2

(12) United States Patent
Suzuki

(10) Patent No.: US 6,821,606 B2
(45) Date of Patent: Nov. 23, 2004

(54) PLASTIC SHEET HAVING CREASING LINES AND CREASING-LINE-FORMING BLADE FOR PLASTIC SHEET

(76) Inventor: Kunitsugu Suzuki, 2-231-2 Shinozakicho, Edogawa-ku, Tokyo (JP), 133-0061

( * ) Notice: Subject to any disclaimer, the term of this patent is extended or adjusted under 35 U.S.C. 154(b) by 0 days.

(21) Appl. No.: 10/307,475

(22) Filed: Dec. 2, 2002

(65) Prior Publication Data

US 2003/0104916 A1 Jun. 5, 2003

(30) Foreign Application Priority Data

Dec. 3, 2001 (JP) .................................... 2001-368793

(51) Int. Cl.[7] .................................... B32B 3/28

(52) U.S. Cl. .................................... 428/167; 428/156

(58) Field of Search .................................... 428/156, 167, 428/192, 194, 152, 542.8; 206/784; 220/62, 62.1; 229/939

(56) References Cited

U.S. PATENT DOCUMENTS 5,302,435 A * 4/1994 Hashimoto .................. 428/167
5,741,570 A * 4/1998 Seufert .................. 428/167
6,391,424 B1 5/2002 Suzuki
6,558,775 B1 * 5/2003 Suzuki .................. 428/167

OTHER PUBLICATIONS

Merriam–Webster's Collegiate Dictionary, 1998, Merriam-Webster, Incorporated, Tenth Edition, p. 1256.*

* cited by examiner

*Primary Examiner*—Harold Pyon
*Assistant Examiner*—Alicia Chevalier
(74) *Attorney, Agent, or Firm*—Oblon, Spivak, McClelland, Maier & Neustadt, P.C.

(57) ABSTRACT

A plastic sheet has a plurality of creasing lines. Each creasing line includes a main groove having a narrow bottom surface and a pair of opposed side surfaces each slanting at a certain angle; and a plurality of slant grooves disposed at a certain pitch in the longitudinal direction of the main groove. Each slant groove is formed by means of two or more curved projections to have at least one narrow bottom surface extending along an inclined direction with respect to the longitudinal direction of the main groove.

1 Claim, 8 Drawing Sheets

A: LENGTH OF TRANSVERSE BLADE

B: LENGTH OF INCLINED BLADE

PLASTIC SHEET HAVING CREASING LINES AND CREASING-LINE-FORMING BLADE FOR PLASTIC SHEET

BACKGROUND OF THE INVENTION

1. Field of the Invention

The present invention relates to a plastic sheet which has creasing lines, each formed of a groove having a bottom surface and a pair of opposed side surfaces each slanting at a certain angle, as well as to a creasing-line-forming blade for forming the plastic sheet.

When a packaging container is to be formed through bending a plastic sheet, as shown in FIG. 1, grooves 102 are formed on a sheet 1 punched into a planar shape corresponding to the shape of the container, and the sheet 1 is then bent along the grooves 102 to thereby complete the container as shown in FIG. 2. The grooves 102 are called "lines for folding" or simply "creasing lines." The creasing lines are formed by a process such that a member called a "creasing-line-forming blade" is pressed against the sheet 1.

The technique for bending a sheet after formation of creasing lines by use of creasing-line-forming blade has conventionally been used for fabrication of paper containers. However, when this technique is applied to fabrication of plastic containers, fabrication of containers having corners of a desired angle is difficult, because a plastic sheet has higher resistance against bending and higher elasticity than does a paper sheet.

Various techniques for solving the above-described problems have been proposed. One solution is employment of creasing lines having a special shape to thereby facilitate bending operation. For example, Japanese Utility Model Publication (kokoku) No. 4-9345 discloses a plastic sheet having creasing lines each formed of a groove in which projections and depressions are formed alternately on the bottom surface along the longitudinal direction (along a creasing line) thereof. Japanese Patent Application Laid-Open (kokai) No. 64-40317 discloses a plastic sheet having creasing lines each formed of a groove in which holes are formed in the bottom portion at a predetermined pitch along the longitudinal direction thereof.

In relation to a method of bending a plastic sheet, Japanese Patent Application Laid-Open (kokai) No. 2-98422 discloses a method in which a plastic sheet having creasing lines is first folded at each of the creasing lines, then unfolded to the original state, and then subjected to a bending process.

Furthermore, a creasing-line-forming blade having an improved structure has been proposed. Japanese Patent Application Laid-Open (kokai) No. 1-141720 (Japanese Patent No. 2541252) discloses a creasing-line-forming blade for a plastic sheet whose tip end has depressed portions and projected portions arranged alternately along the longitudinal direction, wherein the depressed portion has a length of 0.3 to 2 mm, the projected portion has a length of 0.02 to 0.15 mm, the tip end of the projected portion has a width not greater than 0.5 mm, and the tip angle is 30 to 130°. FIG. 3 shows a perspective view of an example of such a creasing-line-forming blade. Each projected portion 210 of a creasing-line-forming blade 2 has a sharp point, and each depressed portion 211 of the creasing-line-forming blade 2 has a flat shape. However, the projected portion 210 is not necessarily required to have the shape of a sharp cutting edge.

FIG. 4 shows a plastic sheet 1 on which creasing lines 110 have been formed by use of the creasing-line-forming blade 2. Upon the creasing-line-forming blade 2 being pressed onto the plastic sheet 1, the plastic sheet 1 deforms, so that creasing lines 110 are formed. Almost no plastic material remains at each groove portion 111 formed by means of the projected portion 210 of the creasing-line-forming blade 2, but plastic material remains at each projection 112 formed by means of the depressed portion 211 of the creasing-line-forming blade 2.

When an automatic container fabrication machine is used, a punched plastic sheet having creasing lines can be automatically formed into a three-dimensional container and sealed after placement of an article therein. However, such automatic container fabrication machine has involved a problem in that the automatic container fabrication machine fails to form the plastic sheet into a three-dimensional structure due to breakage of a creased portion. Increasing the thickness of portions where plastic material remains is one measure for avoiding such a problem of breakage. However, in this case, bending the plastic sheet becomes difficult, along with forming the plastic sheet by use of an automatic container fabrication machine. Japanese Patent Application Laid-Open (kokai) No. 2001-62909 (Title of the Invention: PLASTIC SHEET HAVING CREASING LINES AND CREASING-LINE-FORMING BLADE FOR PLASTIC SHEET) discloses an invention which can cope with the above-discussed problems. This invention is directed to a creasing-line-forming blade for forming creasing lines which have a novel shape and hardly break, as well as to a plastic sheet which is formed by use of the creasing-line-forming blade and which can be formed into a container by use of an automatic container fabrication machine.

An automatic container fabrication machine can perform, at high speed, a series of operations for bending a sheet to complete a three-dimensional container, charging a liquid or the like into the container, and sealing the container. Although the above-described techniques have enabled fabrication of containers through bending of a plastic sheet having creasing lines, the conventional plastic sheet cannot completely cope with such an automatic container fabrication machine. Use of the conventional plastic sheet will raise problems such as breakage of a creasing line portion, and failure in formation of a three-dimensional shape.

In a plastic sheet having creasing lines, bending operation is facilitated through a decrease in the thickness (residual thickness) of the plastic sheet at the bottom of each groove serving as a creasing line. However, when the residual thickness is decreased, a strong force tends to act locally at creasing line portions during bending, especially during a step of forming a plastic sheet into a final shape by use of an automatic container fabrication machine, thereby resulting in breakage of the container from a creasing line portion. This problem of breakage becomes remarkable when holes are provided at creasing line portions in order to facilitate a bending operation.

Although the invention disclosed in Japanese Patent Application Laid-Open No. 2001-62909 has solved the above-described problems to a certain level, further improved plastic sheets having creasing lines have been demanded.

SUMMARY OF THE INVENTION

An object of the present invention is to provide an improved plastic sheet which has creasing lines which are sufficiently soft to enable use of an automatic container fabrication machine and which can impart improved texture (sensation imparted when the creasing lines are touched).

Another object of the present invention is to provide a creasing-line-forming blade which is used for forming creasing lines on a plastic sheet to thereby produce the improved plastic sheet of the present invention.

The present invention provides a plastic sheet which has a plurality of creasing lines. Each creasing line comprises a main groove having a narrow bottom surface and a pair of opposed side surfaces each slanting at a certain angle; and a plurality of slant grooves disposed at a certain pitch in the longitudinal direction of the main groove. Each slant groove is formed by means of two or more curved projections to have at least one narrow bottom surface extending along an inclined direction with respect to the longitudinal direction of the main groove.

Preferably, the bottom surface of each slant groove extends at an angle of 20° to 70° with respect to a line perpendicular to the main groove. However, the angle may be changed in accordance with, for example, the material and thickness of the plastic sheet.

The present invention further provides a creasing-line-forming blade for plastic sheet. The blade has a narrow tip end extending in the width direction, and a pair of opposed side surfaces each continuing from the tip-end surface and slanting at a certain angle. A plurality of recesses are formed at the tip end at a certain pitch in the width direction. Each recess includes at least two curved depressions which are located adjacent to each other and extend along an inclined direction with respect to the width direction. The boundary portion between the curved depressions forms an inclined blade portion.

Preferably, the inclined blade portion extends at an angle of 20° to 70° with respect to a line perpendicular to the longitudinal blade portion. However, the angle may be changed in accordance with, for example, the material and thickness of the plastic sheet.

DESCRIPTION OF THE PREFERRED EMBODIMENTS

Embodiments of the present invention will be described with reference to the drawings.

Figure 1:
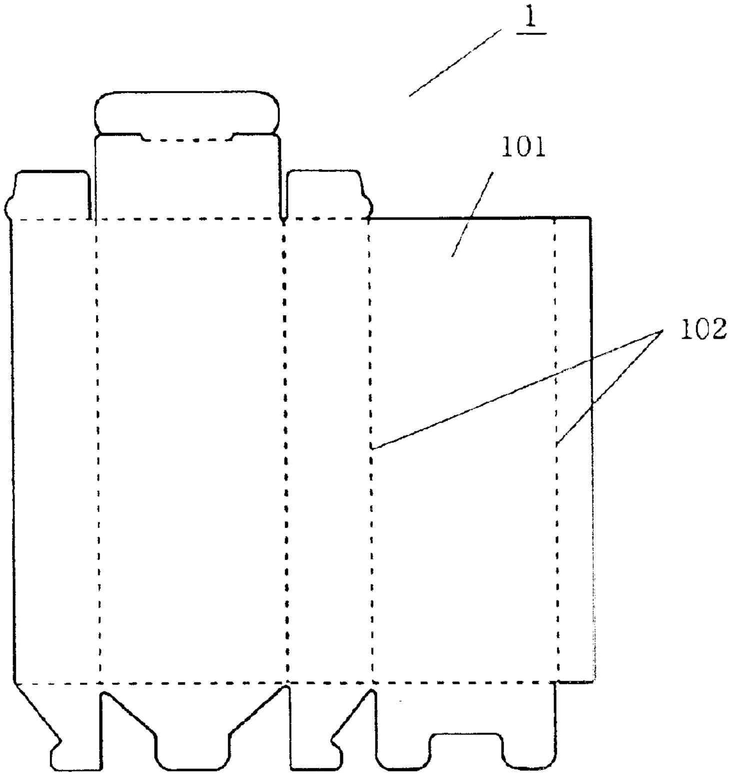
FIG. 1 is a plan view of a plastic sheet having creasing lines for fabricating a packaging container.
Figure 2:
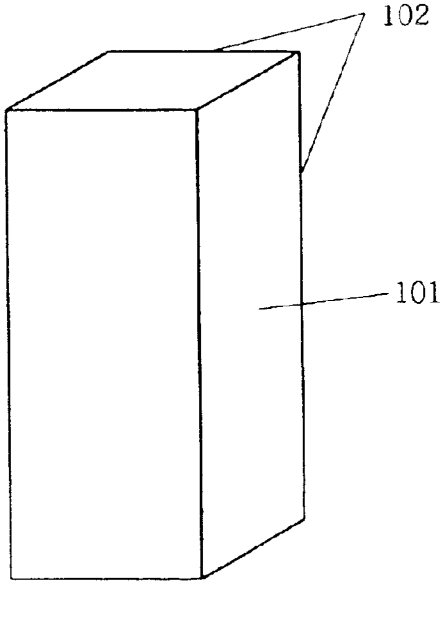
FIG. 2 is a perspective view of a container fabricated from the plastic sheet of FIG. 1.
Figure 3:
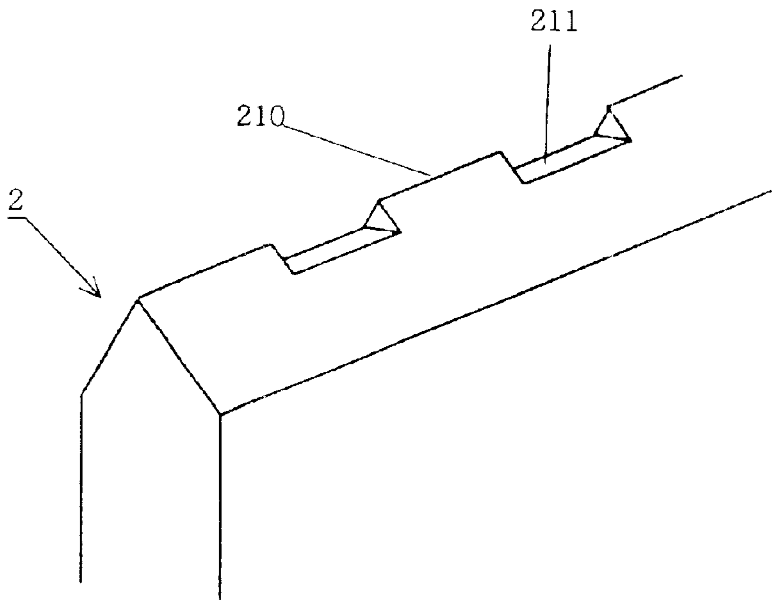
FIG.3 PRIOR ART
FIG. 3 is a perspective view of a conventional creasing-line-forming blade, showing the structure of the blade.
Figure 4:
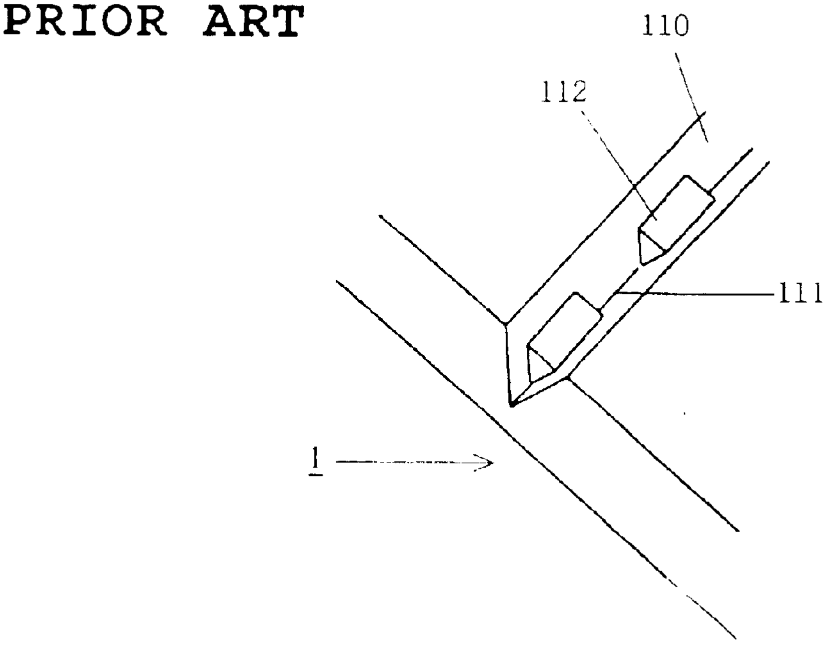
FIG.4 PRIOR ART
FIG. 4 is a perspective view of a plastic sheet, showing a creasing line which is formed on the plastic sheet by use of the conventional creasing-line-forming blade shown in FIG. 3.
Figure 5A:
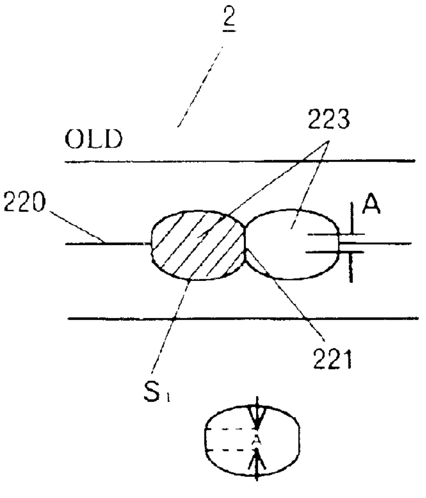
FIGS. 5A and 5B are top views of creasing-line-forming blades for comparison between a transverse blade portion of a conventional creasing-line-forming blade and an inclined blade portion of a creasing-line-forming blade according to the present invention.
Figure 5B:
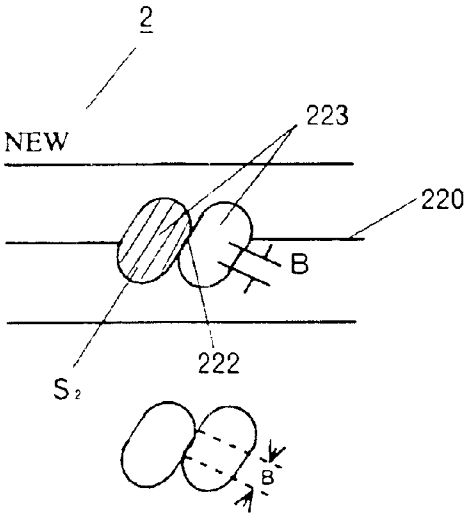
Figure 6A:
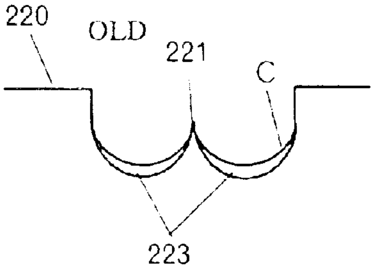
FIGS. 6A and 6B are side views of creasing-line-forming blades for comparison between the transverse blade portion of the conventional creasing-line-forming blade and the inclined blade portion of the creasing-line-forming blade according to the present invention.
Figure 6B:
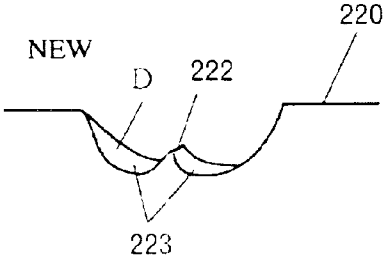
Figure 6C:
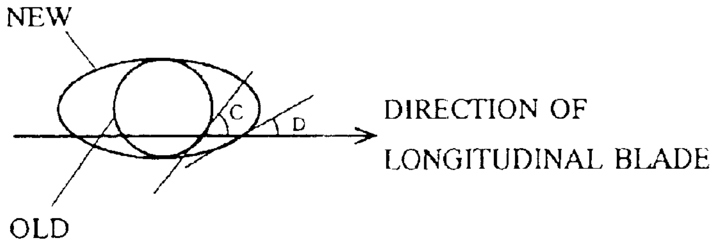
FIG. 6C is a view for comparison between the transverse blade portion and the inclined blade portion.

Since the present invention is an improvement of the invention disclosed in Japanese Patent Application Laid-Open No. 2001-62909, a creasing-line-forming blade according to the present invention and a creasing-line-forming blade disclosed in Japanese Patent Application Laid-Open No. 2001-62909 will be compared with reference to FIGS. 5A and 5B and FIGS. 6A to 6C. The creasing-line-forming blade disclosed in Japanese Patent Application Laid-Open No. 2001-62909 will be referred to as an "old blade" or "old type," and the creasing-line-forming blade according to the present invention will be referred to as a "new blade" or "new type." FIGS. 5A and 5B show the area of a curved depression of the old blade and the area of a curved depression of the new blade for comparison. The old blade includes a longitudinal blade portion 220 and a transverse blade portion 221 (a blade portion extending perpendicular to the longitudinal blade portion 220). The transverse blade portion 221 is formed as a result of formation of curved concave surfaces 223 (curved depressions) located on opposite sides of the transverse blade portion 221. The area of each curved concave surface 223 (hatched portion) is represented by $S_1$. The new blade includes a longitudinal blade portion 220 and an inclined blade portion 222 (a blade portion extending at angle of less than 90° with respect to the longitudinal blade portion 220). The inclined blade portion 222 is formed as a result of formation of curved concave surfaces 223 (curved depressions) located on opposite sides of the inclined blade portion 222. The area of each curved concave surface 223 is represented by $S_2$. In the old blade, the curved concave surfaces 223 are formed through an operation of positioning a cylindrical cutter having a certain diameter above the tip end of the blade while orientating the cutter perpendicular to the longitudinal blade portion, and feeding the cutter to a certain depth. In the new blade, the curved concave surfaces 223 are formed through an operation of positioning a cylindrical cutter having the same diameter above the tip end of the blade while orientating the cutter at a certain angle with respect to the longitudinal blade portion, and feeding the cutter to the certain depth. In such a case, the area S2 becomes greater than the area S1. Further, as shown in FIGS. 6A to 6C, the inclination angle D of the curved concave portion in the new blade is smaller than the inclination angle C of the curved concave portion in the old blade. This is because, as shown in FIG. 6C, whereas the cross section of the curved concave portion in the old blade along the direction of the longitudinal blade portion is a portion of a circle, the cross section of the curved concave portion in the new blade along the direction of the longitudinal blade portion is a portion of an ellipse. In other words, the inclination of the curved concave portion in the new blade is gentle. Next, the creasing-line-forming blade according to the present invention will be described in detail.

Figure 7:
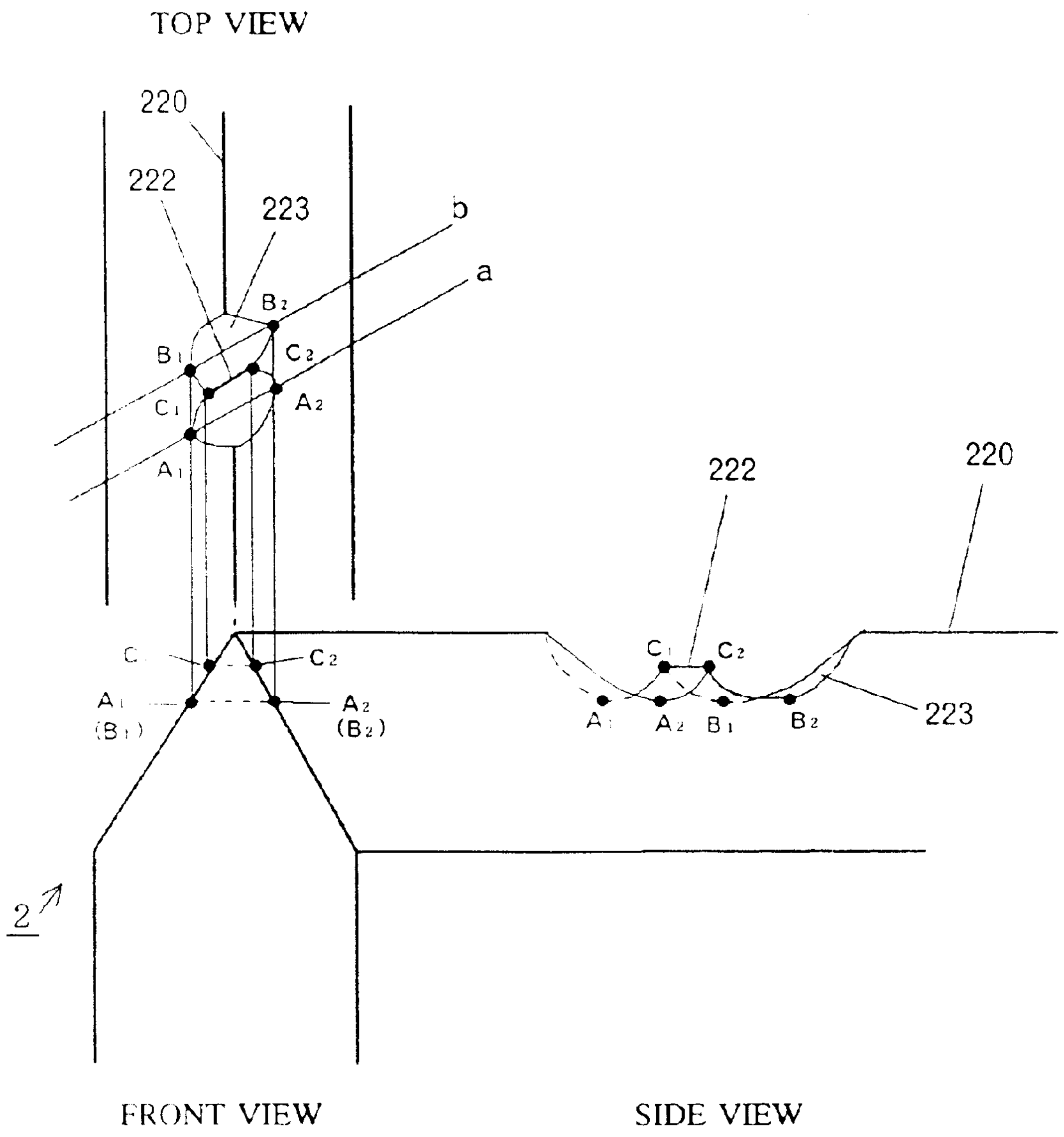
FIG. 7 is a perspective view of the creasing-line-forming blade according to the present invention, accompanied by a top view of the creasing-line-forming blade.

FIG. 7 shows an example of the creasing-line-forming blade according to the present invention in which a plurality of recessed portions are formed at the tip end of the blade at a certain pitch in the width direction; and each recess includes two curved concave surfaces (i.e., curved depressions). When a view from one end of the longitudinal blade portion 220 of the creasing-line-forming blade 2 in a standing orientation is considered a front view, the inclined blade portion 222 appears as a segment $C_1$-$C_2$ in a side view, because the inclined blade portion 222 inclines with respect to the transverse blade portion in the old blade. The bottoms (deepest portions) of the curved depressions 223 are represented by a segment $A_1$-$A_2$ and a segment $B_1$-$B_2$, respectively. The segments $C_1$-$C_2$, $A_1$-$A_2$, and $B_1$-$B_2$ are parallel to one another. When a creasing line is formed on a plastic sheet by use of the creasing-line-forming blade 2 shown in FIG. 7, a greater amount of resin remains at portions of the formed creasing line corresponding to the curved depressions of the creasing-line-forming blade. The shape and thickness of the resin-remaining portions can be determined by the shape and depth of the curved depressions. In the example shown in FIG. 7, the curved depressions each assume a shape obtained by removing the tip end portion of the creasing-line-forming blade through penetration of a cylinder from a side surface thereof in an inclined direction. However, the shape of the curved depressions can be changed by changing a manner of cutting.

Figure 8:
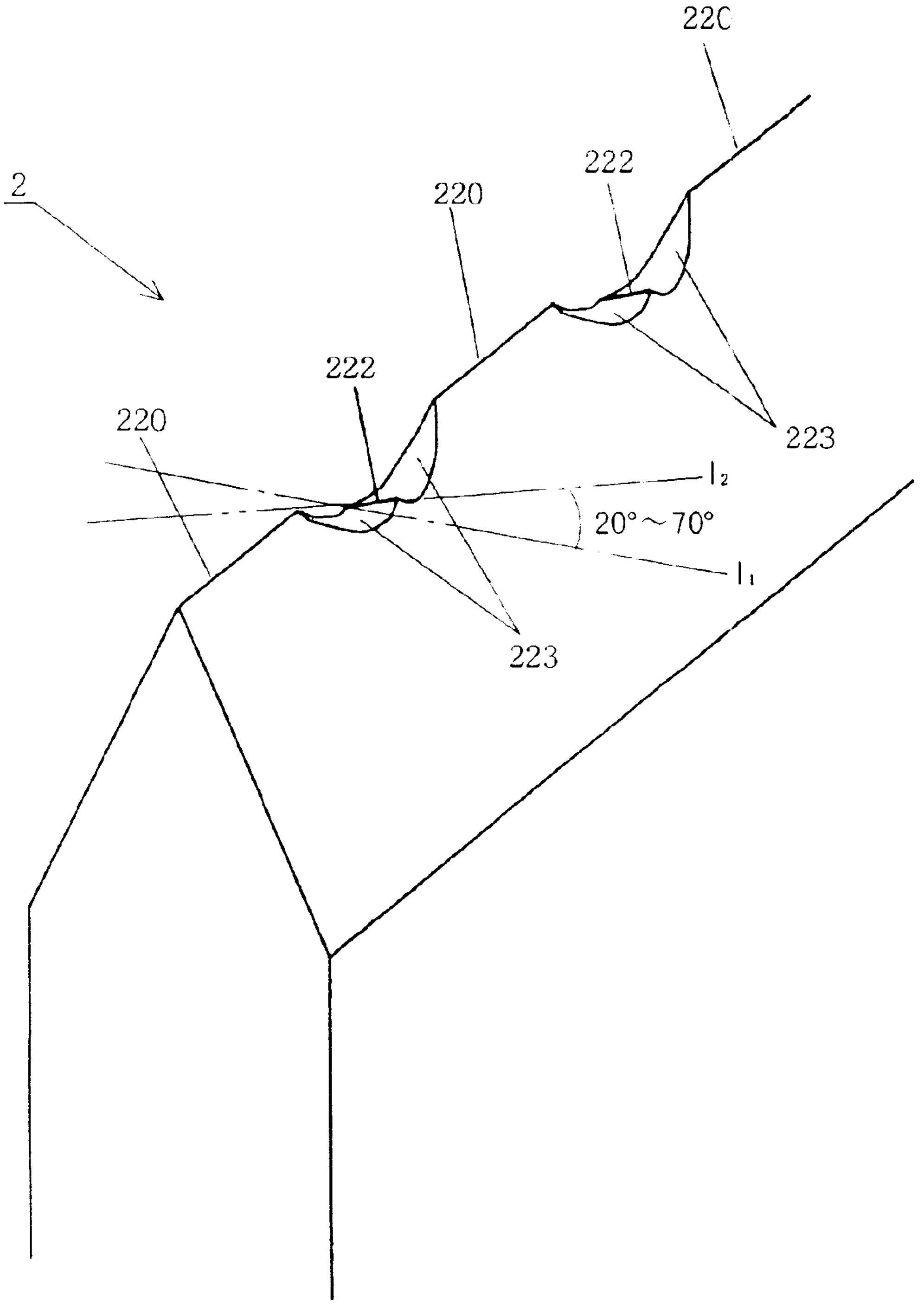
FIG. 8 is a perspective view of one example of the creasing-line-forming blade according to the present invention in which each recess includes two curved depressions.

FIG. 8 is a perspective view of the creasing-line-forming blade shown in FIG. 7. Longitudinal blade portions and inclined blade portions are alternately formed on the creasing-line-forming blade 2 at constant intervals; i.e., longitudinal blade portion 220, curved depression 223, inclined blade portion 222, curved depression 223, longitudinal blade portion 220, curved depression 223, inclined blade portion 222, etc. are formed from the left side in FIG. 8. When the direction perpendicular to the longitudinal blade portion is represented by direction $I_1$, the direction $I_2$ of the inclined blade portion forms an angle of 20° to 70° with the direction $I_1$.

Figure 9:
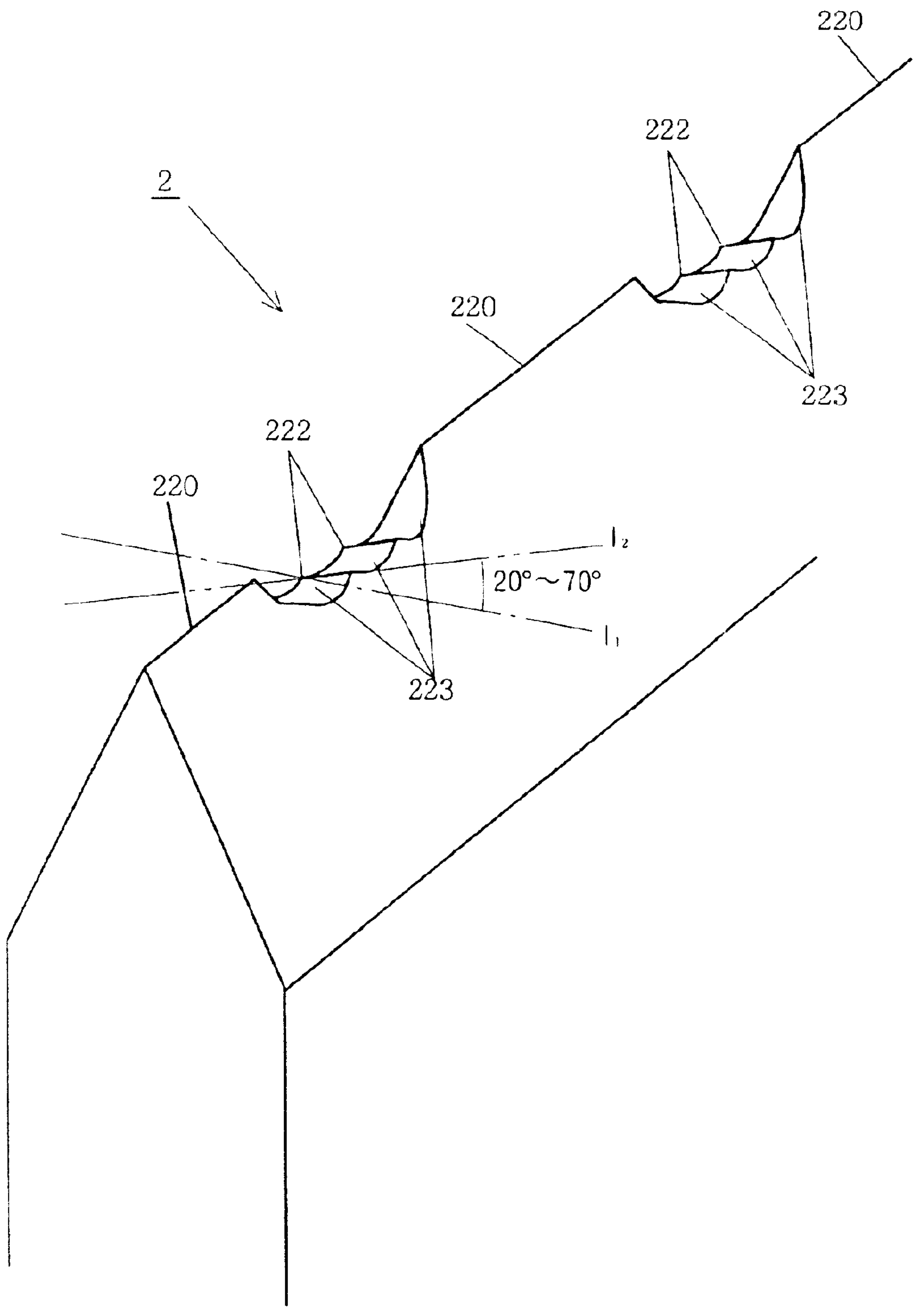
FIG. 9 is a perspective view of another example of the creasing-line-forming blade according to the present invention in which each recess includes three curved depressions.

FIG. 9 shows the case where each recess includes three curved depressions (i.e., three curved concave surfaces) to thereby form two inclined blade portions. In this example, on the creasing-line-forming blade 2, two inclined blade portion are provided between adjacent longitudinal blade portions; i.e., longitudinal blade portion 220, curved depression 223, inclined blade portion 222, curved depression 223, inclined blade portion 222, curved depression 223, longitudinal blade portion 220, curved depression 223, inclined blade portion 222, etc. are formed from the left side in FIG. 9. When the direction perpendicular to the longitudinal blade portion is represented by direction $I_1$, the direction $I_2$ of the inclined blade portion forms an angle of 20° to 70° with the direction $I_1$. In the old-type creasing-line-forming blade, since the direction $I_2$ coincides with the direction $I_1$; i.e., the blade portion formed between the curved depressions extends perpendicular to the longitudinal blade portion, the blade portion formed between the curved depressions is called a transverse blade portion.

Figure 10:
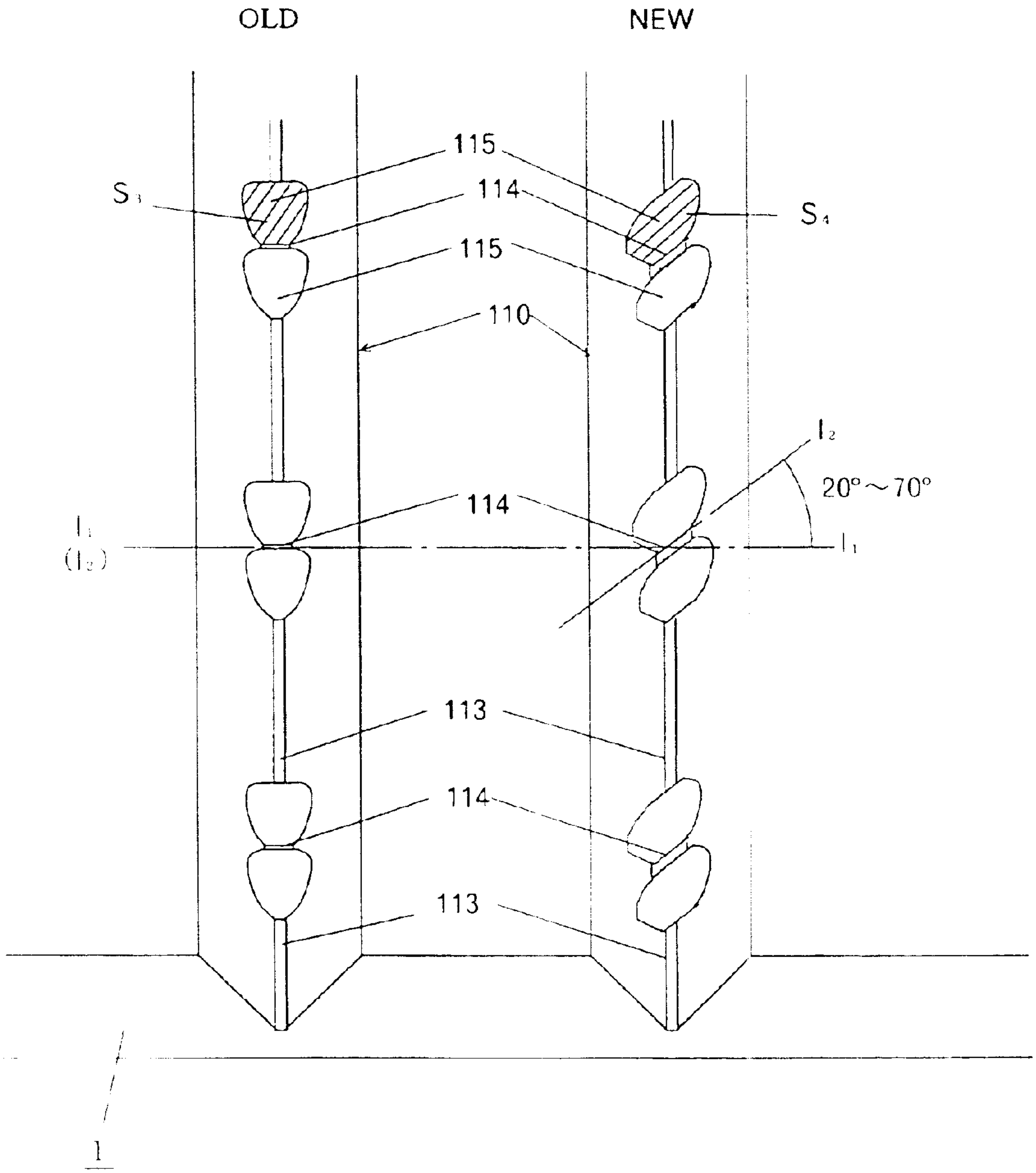
FIG. 10 is an overhead oblique view of a plastic sheet having creasing lines according to the present invention, showing a groove (creasing line) formed by use of the creasing-line-forming blade according to the present invention.

FIG. 10 shows, for comparison, a creasing line formed by use of the old-type creasing-line-forming blade having two curved depressions at each recess and a creasing line formed by use of the new-type creasing-line-forming blade according to the present invention. In both cases, the curved concave surfaces on the creasing-line-forming blade form curved convex surfaces 115 on a sheet 1. The area $S_4$ of each curved convex surface (hatched portion) formed by use of the new blade becomes greater than the area $S_3$ of each curved convex surface (hatched portion) formed by use of the old blade. In addition, when the direction of a bottom portion 114 of a shallow, short groove formed by each transverse blade portion of the old-type creasing-line-forming blade is called direction $I_1$, a bottom portion 114 of a shallow, short groove formed by each inclined blade portion of the new-type creasing-line-forming blade extends along a direction $I_2$, which forms an angle of 20° to 70° with respect to the direction $I_1$. This is why the curved convex surfaces 115 each have an increased area. The curved projection (curved convex surface) formed by use of the new blade according to the present invention has a smaller radius of curvature, as viewed in a cross section of the curve convex surface 115 along the direction of a bottom portion 113 (the bottom of a groove formed by the longitudinal blade portion) extending along the longitudinal direction of the creasing line. Therefore, creasing lines formed by use of the creasing-line-forming blade of the present invention provide improved texture and enhanced elasticity.

The plastic sheet 1 is a single-layer sheet or a multi-layer sheet formed of polyethylene terephthalate (PET), polyvinyl chloride (PVC), polypropylene (PP), or any other suitable resin material and has a thickness of about 0.1 mm to about 1.0 mm. A creasing-line-forming blade is a tool for forming creasing lines on a plastic sheet. The strength of portions at which creasing lines are formed can be changed on the basis of the material and thickness of the plastic sheet, through changing the combination of longitudinal blade portions, inclined blade portions, and curved depressions and through changing the depths thereof.

EXAMPLE

Figure 11:
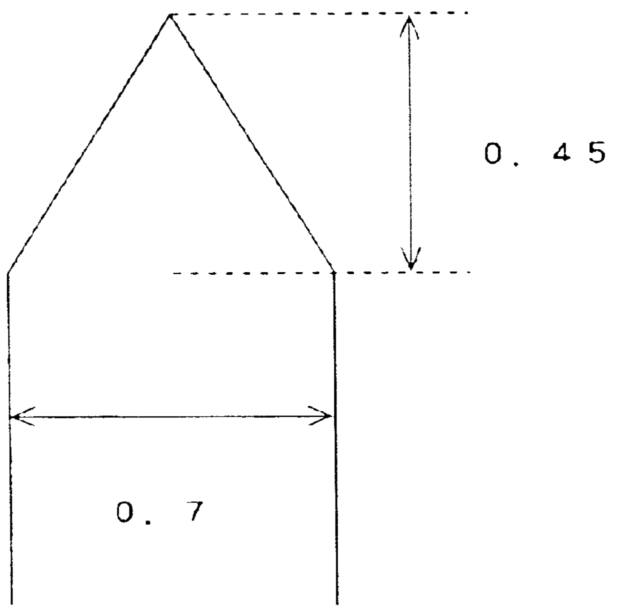
FIG. 11 is a front view of the creasing-line-forming blade according to the present invention (as viewed from one end of the longitudinal blade portion), showing example dimensions of the creasing-line-forming blade according to the present invention.
Figure 12:
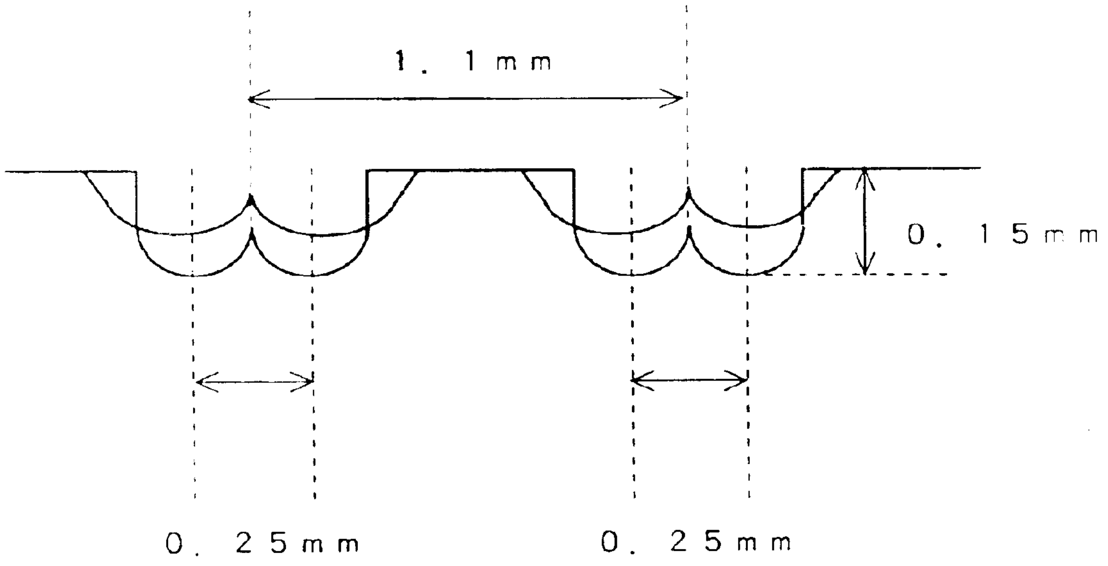
FIG. 12 is an oblique side view of the creasing-line-forming blade according to the present invention (as viewed from slightly above a horizontal direction), showing example dimensions of the creasing-line-forming blade according to the present invention.

FIGS. 11 and 12 show example dimensions of a creasing-line-forming blade used for forming creasing lines on a plastic sheet. Although these drawings are not depicted to accurately reflect the actual dimensional relationship, values shown in these drawings accurately indicate dimensions of an example creasing-line-forming blade. As shown in FIG. 11, the creasing-line-forming blade has a blade height of 0.45 mm and a blade thickness of 0.7 mm. FIG. 12 is a side view of the creasing-line-forming blade. The pitch of inclined blade portions is 1.1 mm, and the distance between the deepest portions of the curved depressions is 0.25 mm. The distance between the tip end of the blade and the deepest portions is 0.15 mm.

The creasing-line-forming blade according to the present invention shown in FIGS. 11 and 12 provides the same effect as that attained by use of the blade disclosed in Japanese Patent Application Laid-Open No. 2001-62909 and having a blade height of 0.6 mm and a blade thickness of 1.0 mm. This means that through replacement of transverse blade portions with inclined blade portions, the area of each curved depression increases, whereby the area of curved projections which are formed upon formation of creasing lines on a plastic sheet can be increased. This enables design of a sharper creasing-line-forming blade.

The present invention has following features:

i) A creasing-line-forming blade suitable for a plastic material to be used can be designed with ease through changing the manner of forming the curved depressions.

ii) Since the longitudinal blade portions and the inclined blade portions are automatically formed through formation of the curved depressions, the creasing-line-forming blade can be fabricated easily.

A plastic sheet has elasticity. Therefore, depending on a manner of forming creasing lines, the plastic sheet may restore its original shape due to the elasticity after being folded along creasing lines. Therefore, if such a plastic sheet is formed into the shape of a container, the formed shape may deteriorate with passage of time. Therefore, a manner of forming creasing lines is an important factor in fabrication of containers which do not cause deformation. Furthermore, designing creasing lines in consideration of the material of a plastic sheet to be used is important. In creasing lines of the present invention, a plastic material left by means of the inclined blade portion and the curved depressions suppresses elasticity. In addition, a creasing-line-forming blade which can cope with any material can be designed through determining the combination of the plurality of curved depressions and longitudinal blade portions.

The creasing-line-forming blade of the present invention can be designed easily to be suited for each of various types of plastic sheet materials. In the plastic sheet having creasing lines according to the present invention, since the bottom portions of the creasing lines along which the plastic sheet is bent are not arranged simply along a straight line, partial breakage does not propagate to other portions. There was performed a test in which the plastic sheet according to the present invention was formed into a packaging container by use of an automatic container fabrication machine in which a relatively large folding force acted on the plastic sheet. The results of the test demonstrates that the ratio of generation of breakage decreases.

Since each curved depression has curved side walls, grooves formed in a plastic sheet and serving as creasing lines have a reduced number of sharp edges or corners, thus enabling production of a transparent container which mitigates light scattering, renders creases inconspicuous, and has excellent appearance.

Further, the complicated shape of the crease lines prevents restoration of creasing line portions to their original shapes, which would otherwise occur due to elasticity of the plastic sheet, so that the degree of deformation after a forming process can be decreased. In addition, the creasing-line-forming blade can be adjusted over a widened range in accordance with a material to be used, through, for example, changing the number of inclined blade portions.

Although the effects attained by the present invention are basically the same as those attained by the invention of Japanese Patent Application Laid-Open No. 2001-62909, the present invention is advantageous over the invention of Japanese Patent Application Laid-Open No. 2001-62909 in the following points. When the depth of the curved depressions is maintained constant, the inclined blade portions of the present invention increase the areas of the curved depressions, as compared with the transverse blade portions of the old-type creasing-line-forming blade. Therefore, the elasticity of creasing lines can be maintained high. Moreover, as compared with curved depressions associated with transverse blade portions of the old creasing-line-forming blade, curved depressions extending along an inclined direction each have a smaller inclination angle, as measured along the widthwise direction (the direction of the longitudinal blade portion). Therefore, grooves of a container formed from the plastic sheet according to the present invention provide favorable texture when touched.

Obviously, numerous modifications and variations of the present invention are possible in light of the above teachings. It is therefore to be understood that within the scope of the appended claims, the present invention may be practiced otherwise than as specifically described herein.

What is claimed is:

1. A plastic sheet having a plurality of creasing lines each comprising:

a main groove having a narrow bottom surface and a pair of opposed side surfaces each slanting at a certain angle; and a plurality of slant grooves disposed at a certain pitch in the longitudinal direction of the main groove, each slant groove being formed by means of two or more curved projections to have at least one narrow bottom surface extending along an inclined direction with respect to the longitudinal direction of the main groove, wherein the bottom surface of each slant groove extends at an angle of 20° to 70° with respect to a line perpendicular to the main groove.

* * * * *